J. B. HILL.
HARROW.
APPLICATION FILED DEC. 2, 1916.
1,272,260.
Patented July 9, 1918.
2 SHEETS—SHEET 2.
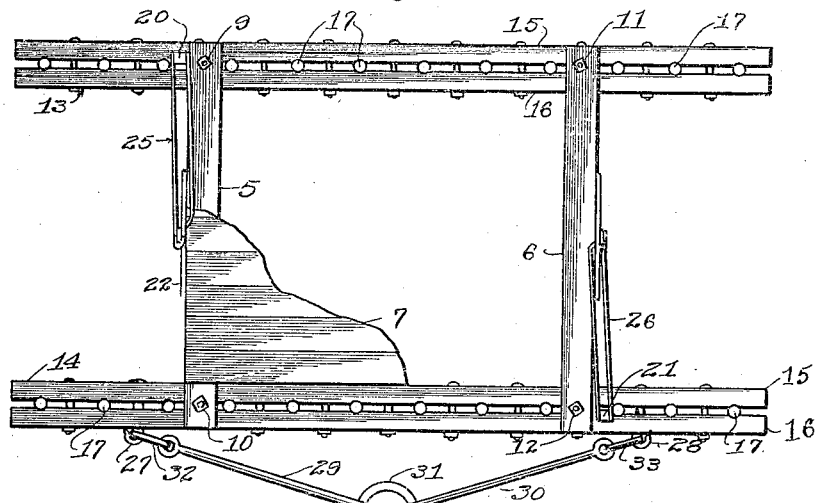
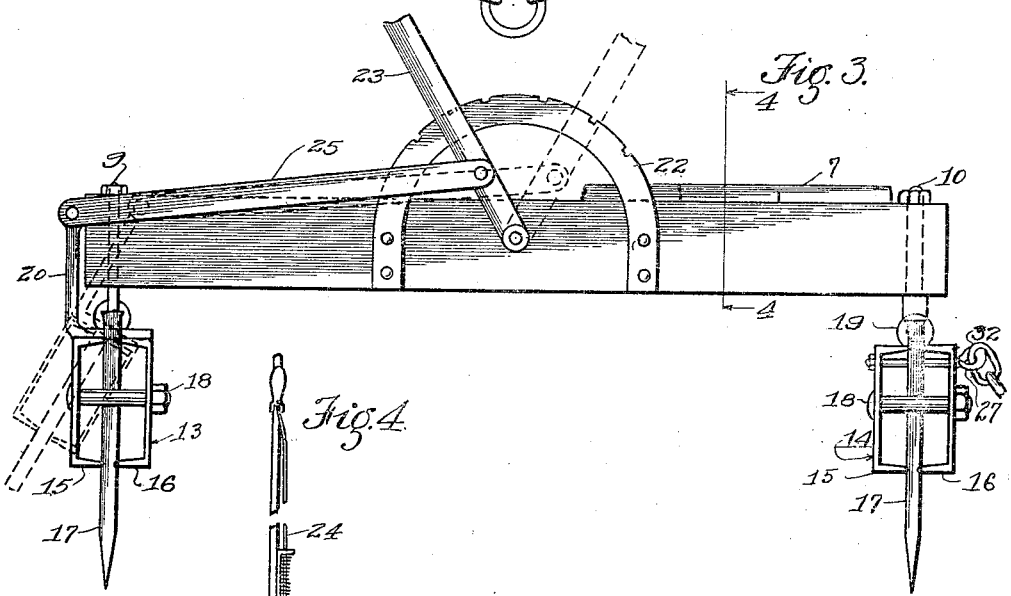
Inventor:
James B. Hill.
by Edmund A. Strauss
Atty.

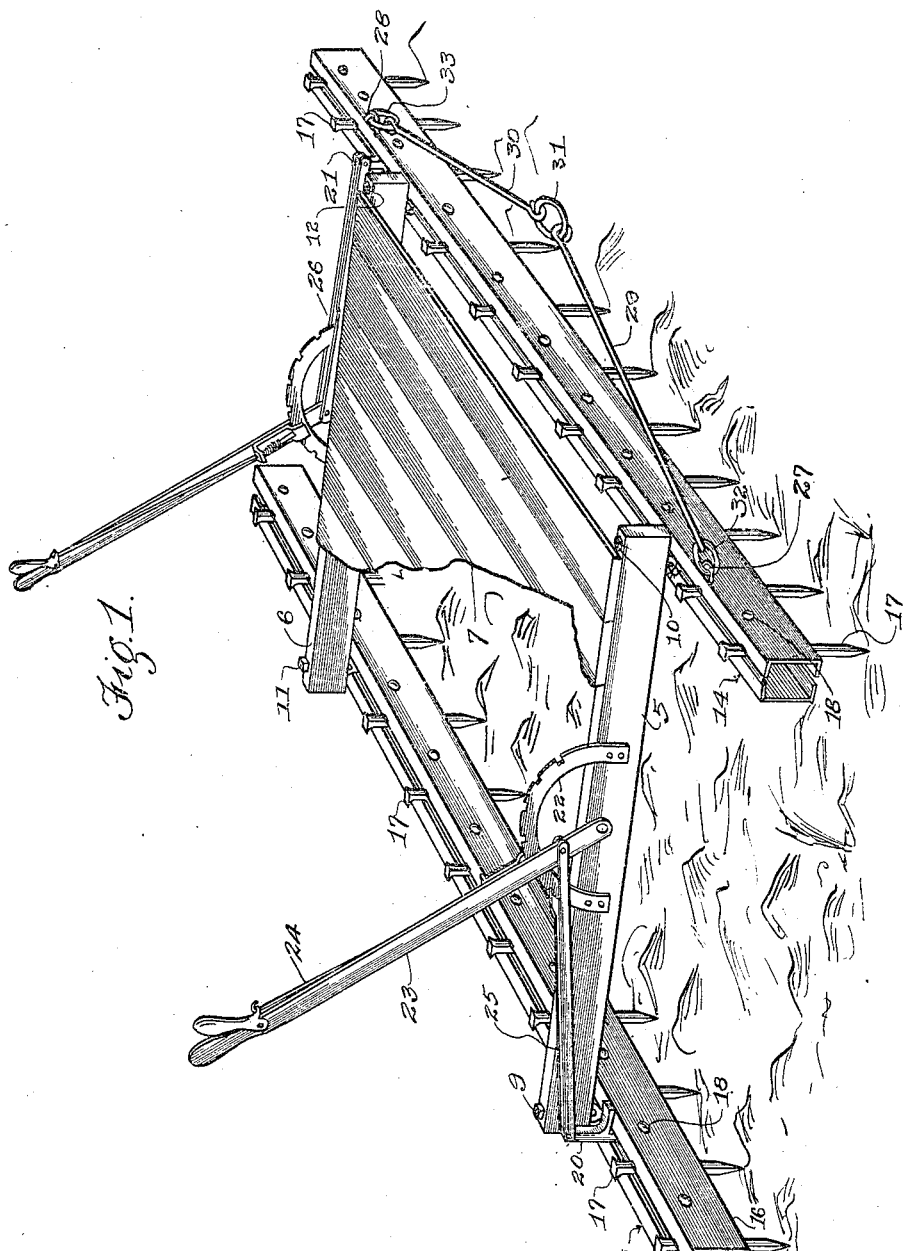

UNITED STATES PATENT OFFICE.

JAMES B. HILL, OF PUENTE, CALIFORNIA.

HARROW.

1,272,260.      Specification of Letters Patent.      Patented July 9, 1918.

Application filed December 2, 1916. Serial No. 134,593.

*To all whom it may concern:*

Be it known that I, JAMES B. HILL, a citizen of the United States, residing at Puente, in the county of Los Angeles, State of California, have invented new and useful Improvements in Harrows, of which the following is a specification.

This invention relates to a harrow having means for adjusting the position of the teeth.

It is an object of this invention to provide a harrow having a plurality of rows of teeth with means for independently adjusting the angle of each row of teeth with respect to the ground.

Harrows have been provided with teeth which may be changed to straight or slanting. With slanting teeth the harrow can be used to break up the hard clods of earth; with straight teeth the soil is pulverized. With my improved harrow the rows of teeth may instantly be changed from straight to slanting so that the implement may be used as a drag to break up the clods or as a harrow to pulverize the soil. By independently adjusting the rows the foremost row may be slanted and the rearmost maintained straight, thereby breaking up the clods first and afterward pulverizing the soil at one operation. By properly adjusting the several rows of teeth the harrow may be accommodated to the particular character of the soil so that efficient pulverizing is obtained by going over the soil a minimum number of times.

An embodiment of my invention is illustrated in the accompanying drawing, in which:

Figure 1 is a perspective view of my improved harrow.

Fig. 2 is a plan view.

Fig. 3 is an enlarged side elevation, and,

Fig. 4 is a section as seen on the line 4—4 of Fig. 3.

The harrow comprises a frame which is herein shown as including beams 5 and 6 which are spaced parallel to each other and secured in spaced relation by cross pieces forming a platform 7. The specific construction of the frame is not material to my invention, except that means be provided for mounting the harrow bars therein and for securing thereto levers and quadrants, or equivalent devices for tilting the bars. The frame may also be constructed, if desired, so that a seat may be mounted thereon.

Secured to the beams 5 and 6 at the rear end are eyebolts 9 and 11. Bar 13 is pivotally mounted upon the frame by means of eyebolts which are secured to the bars and linked with eye bolts 9 and 11. The bars are preferably formed of channel irons 15 and 16, which are arranged with the channels, facing inwardly and harrow teeth 17 secured therebetween in notches formed thereon. The teeth may be clamped in position by means of bolts 18. This construction permits the teeth to be removed and replaced, and it is also such that when clamped in position they are firmly secured to the bars. Secured to the beams 5 and 6 at the forward end are bolts 10 and 12 provided with laterally extending pintles. Eye bolts 19 are secured to bar 14 and their eyes linked with the pintles on bolts 10 and 12.

To tilt the bars independently of one another, I have provided each bar with an arm indicated by 20 and 21. Mounted upon beam 5 is a quadrant 22, and pivotally mounted upon the beam and coöperating with the quadrant is a lever 23. Lever 23 has a spring actuated dog 24 which engages the notches on the quadrant. Connecting lever 23 and arm 20 is a link 25, comprising two bars, one end of each bar being pivotally connected to the lever, and the other end to the arm. Arm 21 which is secured to bar 14 is similarly provided with a link 26, which is connected to a lever and quadrant mounted on the frame. The construction is such that, if it is desired to tilt the bar 13, this may be done by moving the lever and engaging it with the quadrant 22 at any selected position, the dog 24 serving to fix the lever to the quadrant. In Fig. 3 the dotted lines show the position of the lever and bar when the teeth are slanted.

Secured to bar 14 are clips 27 and 28. Rods 29 and 30 are secured to each other by means of a ring 31 and are provided at the ends with chain links 32 and 33 whereby the rods may be secured to clips 27 and 28. The ring 31 serves for connection to any draft means for drawing the harrow.

In dragging the harrow over soil which is full of clods, the front bar 14 would be tilted to give a dragging effect and thereby break up the clods. The rear bar 13 may either be maintained straight or at a slant depending upon how well the front bar had broken up the clods. If the rear bar is maintained with the teeth straight, the soil will be pulverized. The bars may be instantly adjusted by means of the levers and quadrants. If it is impossible to pulverize the soil by dragging the harrow over the same once, the teeth may be tilted to effect the greatest amount of pulverizing or breaking of the clods on the first treatment, and then the teeth adjusted to thoroughly pulverize the soil on the second treatment. It is obvious that by independently adjusting the harrow bars there is no waste work done, nor must the harrow be dragged over the ground once for breaking up the clods and then again for pulverizing the soil.

It is within the scope of my invention to provide any number of rows of teeth. In practice, two rows are found sufficient for the treatment of average soil. The lever and quadrant means for adjusting the tilting of the bars is one such that the bars may be adjusted quickly until the proper inclination of the teeth is found for best pulverization of the soil.

What I claim is:

In a harrow, the combination of a framed platform, bars connected to the transversely disposed edges of said platform and below the same, said bars comprised of two parallel members secured together, teeth clamped between said members, eyes clamped between said members, eyes on said frame linked with the first mentioned eyes, a quadrant and lever secured to each longitudinally extending side of said platform, a link pivotally secured to each of said levers and to each of said bars, whereby said bars may be moved independently of each other.

In witness that I claim the foregoing I have hereunto subscribed my name this 20th day of November, 1916.

JAMES B. HILL.

Copies of this patent may be obtained for five cents each, by addressing the "Commissioner of Patents, Washington, D. C."